US 11,222,234 B2

(12) United States Patent
Wang

(10) Patent No.: US 11,222,234 B2
(45) Date of Patent: Jan. 11, 2022

(54) METHOD AND APPARATUS FOR TRAINING A CONVOLUTIONAL NEURAL NETWORK TO DETECT DEFECTS

(71) Applicant: BOE Technology Group Co., Ltd., Beijing (CN)

(72) Inventor: Tingting Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 311 days.

(21) Appl. No.: 16/486,025

(22) PCT Filed: Apr. 2, 2019

(86) PCT No.: PCT/CN2019/081005
§ 371 (c)(1),
(2) Date: Aug. 14, 2019

(87) PCT Pub. No.: WO2020/048119
PCT Pub. Date: Mar. 12, 2020

(65) Prior Publication Data
US 2021/0334587 A1    Oct. 28, 2021

(30) Foreign Application Priority Data
Sep. 4, 2018    (CN) .......................... 201811025886.X

(51) Int. Cl.
*G06K 9/00*        (2006.01)
*G06K 9/62*        (2006.01)
(Continued)

(52) U.S. Cl.
CPC .......... *G06K 9/6256* (2013.01); *G01N 23/04* (2013.01); *G01N 23/18* (2013.01); *G06K 9/3233* (2013.01);
(Continued)

(58) Field of Classification Search
CPC .... G06K 9/6256; G06K 9/3233; G06K 9/628; G06T 7/001; G06T 5/009; G06T 5/002;
(Continued)

(56) References Cited

U.S. PATENT DOCUMENTS 5,208,528 A * 5/1993 Quintard .............. G01R 31/309
250/330
5,493,594 A * 2/1996 Hamada .............. G01N 23/044
378/34
(Continued)

FOREIGN PATENT DOCUMENTS

CN      105891215 A      8/2016
CN      106874840 A      6/2017
(Continued)

OTHER PUBLICATIONS

International Search Report & Written Opinion dated Jul. 8, 2019, regarding PCT/CN2019/081005.
(Continued)

*Primary Examiner* — Mahendra R Patel
(74) *Attorney, Agent, or Firm* — Intellectual Valley Law, P.C.

(57) ABSTRACT

The present application discloses a method of training a convolutional neural network for defect inspection. The method includes collecting a training sample set including multiple solder joint images. A respective one of the multiple solder joint images includes at least one solder joint having one of different types of solder joint defects. The at least one solder joint is located substantially in a pre-defined region of interest (ROI) in a center of the image. The method further includes inputting the training sample set to a convolutional neural network to obtain target feature vectors respectively associated with the multiple solder joint images. Additionally, the method includes adjusting network parameters characterizing the convolutional neural network through a (Continued)

training loss function based on the target feature vectors and pre-labeled defect labels corresponding to different types of solder joint defects. The training loss function includes at least two different loss functions.

18 Claims, 8 Drawing Sheets

(51) Int. Cl.
| | |
|---|---|
| $G06K\ 9/32$ | (2006.01) |
| $G06T\ 7/136$ | (2017.01) |
| $G06T\ 5/00$ | (2006.01) |
| $G06N\ 3/04$ | (2006.01) |
| $G06N\ 3/08$ | (2006.01) |
| $G01N\ 23/04$ | (2018.01) |
| $G01N\ 23/18$ | (2018.01) |
| $G06T\ 7/00$ | (2017.01) |

(52) U.S. Cl.
CPC ............... *G06K 9/628* (2013.01); *G06N 3/04* (2013.01); *G06N 3/08* (2013.01); *G06T 5/002* (2013.01); *G06T 5/009* (2013.01); *G06T 7/001* (2013.01); *G06T 7/136* (2017.01); *G01N 2223/401* (2013.01); *G01N 2223/646* (2013.01); *G06T 2207/10116* (2013.01); *G06T 2207/20081* (2013.01); *G06T 2207/20084* (2013.01); *G06T 2207/30141* (2013.01); *G06T 2207/30152* (2013.01)

(58) Field of Classification Search
CPC ........... G06T 7/136; G06T 2207/30141; G06T 2207/30152; G06T 2207/20081; G06T 2207/20084; G06T 2207/10116; G06T 7/0002; G01N 23/04; G01N 23/18; G01N 2223/401; G01N 2223/646; G01N 21/95684; G06N 3/04; G06N 3/08; G01R 31/309
USPC ........................................................ 382/150
See application file for complete search history.

(56) References Cited

U.S. PATENT DOCUMENTS

| | | | | | |
|---|---|---|---|---|---|
| 5,621,811 | A * | 4/1997 | Roder | ................... | G01R 31/302 |
| | | | | | 382/147 |
| 5,751,910 | A * | 5/1998 | Bryant | ................. | G06N 3/0436 |
| | | | | | 706/2 |
| 5,963,662 | A * | 10/1999 | Vachtsevanos | ........ | G01N 21/88 |
| | | | | | 250/332 |
| 6,205,239 | B1 * | 3/2001 | Lin | ................... | G01N 21/95607 |
| | | | | | 257/E21.525 |
| 6,697,151 | B2 * | 2/2004 | Owen | ...................... | B23K 3/08 |
| | | | | | 356/237.1 |
| 7,019,826 | B2 * | 3/2006 | Vook | ..................... | G06T 7/0002 |
| | | | | | 250/559.34 |
| 7,171,037 | B2 * | 1/2007 | Mahon | ............. | G01N 21/95684 |
| | | | | | 382/145 |
| 7,330,528 | B2 * | 2/2008 | Jefferson | ............... | G06T 11/006 |
| | | | | | 378/22 |
| 7,822,261 | B2 * | 10/2010 | Moriya | ............... | G01N 21/8851 |
| | | | | | 382/147 |
| 7,903,864 | B1 * | 3/2011 | Lina | ....................... | G06T 7/0008 |
| | | | | | 382/141 |
| 8,760,665 | B2 * | 6/2014 | Ume | ................... | G01N 21/1702 |
| | | | | | 356/502 |
| 2001/0037673 | A1 * | 11/2001 | Jackson | ................. | G01N 11/10 |
| | | | | | 73/54.23 |
| 2003/0095631 | A1 * | 5/2003 | Rosner | ................... | G01N 23/02 |
| | | | | | 378/98.12 |
| 2003/0113009 | A1 * | 6/2003 | Mueller | ................ | G06T 7/0002 |
| | | | | | 382/147 |
| 2003/0114996 | A1 * | 6/2003 | Ragland | ................. | G01N 23/04 |
| | | | | | 702/35 |
| 2005/0105682 | A1 * | 5/2005 | Heumann | ............ | G01N 23/046 |
| | | | | | 378/58 |
| 2017/0300785 | A1 | 10/2017 | Merhav et al. | | |

FOREIGN PATENT DOCUMENTS

| | | | | |
|---|---|---|---|---|
| JP | 08014846 A | * | 1/1996 | |
| WO | WO-2018072326 A1 | * | 4/2018 | ........... G06T 7/0004 |

OTHER PUBLICATIONS

Extended European Report in the European Patent Application No. 19848922.1, dated Oct. 5, 2021.
Cai Nian et al., "SMT Solder Joint Inspection via a Novel Cascaded Convolutional Neural Network", IEEE Transactions on Components, Packaging and Manufacturing Technology, IEEE, USA, vol. 8, No. 4, Apr. 1, 2018, pp. 670-677, XP011680766, ISSN: 2156-3950, DOI:10.1109/TCCPMT.2018.2789453.
Sebastian Meyer el al., "Neural Network Modeling to Predict Quality and Reliability for BGA Soldier Joints", Electronic Components and Technology Conference (ECTC), 2010 Proceedings 60th, IEEE, Piscataway, NJ, USA, Jun. 1, 2010, pp. 1596-1603, XP031694003, ISBN: 978-1-4244-6410-4.
Vijay Sankaran et al., "Improvements to X-Ray Laminography for Automated Inspection of Soldier Joints", IEEE Transactions on Components, Packaging and Manufacturing Technology, Part C: Manufacturing, IEEE Service Center, Piscataway, NJ, US, vol. 21, No. 2, Apr. 1, 1998, XP011019937, ISSN: 1083-4400.
Kalukin AR et al., "An Improved Method for Inspection of Solder Joints Using X-ray Laminography and X-ray Microtomography", Nineteeth IEEE/CPMT International Elctronics Manufacturing Technology Symposium. Austin, Oct. 14-16, 1996 {Annual International Electronics Manufacturing Technology Symposium. (IEMT)], New York, IEEE, US, vol. Symp. 19, Oct. 14, 1996, pp. 438-445, XO000704351, DOI:10.1109/IEMT.1996.559785.
Jin Wanxin et al., "Reference-free Path-Walking Method for Ball Grid Array Inspection in Surface Mounting Machines", IEEE Transactions on Industrial Electronics, IEEE Service Center, Piscataway, NJ, USA, vol. 64, No. 8, Aug. 1, 2017, pp. 6310-6318, XP011655872, ISSN:0278-0046, DOI:10.1109/TIE.2017.2682008.

* cited by examiner

METHOD AND APPARATUS FOR TRAINING A CONVOLUTIONAL NEURAL NETWORK TO DETECT DEFECTS

CROSS-REFERENCE TO RELATED APPLICATION

This application is a national stage application under 35 U.S.C. § 371 of International Application No. PCT/CN2019/081005 filed Apr. 2, 2019, which claims priority to Chinese Patent Application No. 201811025886.X, filed Sep. 4, 2018, the contents of which are incorporated by reference in the entirety.

TECHNICAL FIELD

The present invention relates to learning and defect-detection technology, more particularly, to a training method based on convolutional neural network, an inspection apparatus implementing the training method for detecting defects, and a defect-inspection method.

BACKGROUND

With technology development in integrated circuit design and manufacture, the development of Ball Grid Array (BGA) chip greatly facilitates miniaturization of electronic systems and is applied widely in modern electronic device design. Because there are so many solder joints used as electrical leads in the electronic device, some solder joint defects like bubble, bridging, irregularity in size, cold joint may occur during manufacturing process. Inspection of the electronic device having solder joints usually will be performed after the manufacturing process to determine if defects exist in any one of the solder joints of the electronic device. General approach is to capture each solder joint image from a BGA chip image and to judge if defect exists in the solder joint image by visual inspection based on professional experience. Human effort in the defect inspection leads to high labor cost, low efficiency, unreliable inspection results due to personal bias.

SUMMARY

In an aspect, the present disclosure provides a method of training a convolutional neural network through deep learning for defect inspection. The method includes collecting a training sample set including multiple solder joint images. A respective one of the multiple solder joint images includes at least one of multiple solder joints having different types of solder joint defects. The at least one of multiple solder joints is located substantially in a pre-defined region of interest (ROI) in a center of the respective one of the multiple solder joint images. The method further includes inputting the training sample set to a convolutional neural network to obtain target feature vectors respectively associated with the multiple solder joint images. Additionally, the method includes adjusting network parameters characterizing the convolutional neural network through a training loss function associated with a classification layer based on the target feature vectors and pre-labeled defect labels corresponding to different types of solder joint defects.

Optionally, the convolutional neural network comprises one or more stages, a respective one stage comprising one or more convolutional layers and one max-pooling layer, a respective one convolutional layer being followed by a feature-enhancement network.

Optionally, the step of adjusting network parameters includes converting a respective one of the defect labels to a first K-dimension feature vector corresponding to a respective one of different types of solder joint defects. The step further includes transposing the first K-dimension feature vector to a transposed K-dimension feature vector. Additionally, the step includes reducing dimensionality of a respective one of the target feature vectors corresponding to a respective one of the multiple solder joint images to a second K-dimension feature vector. Furthermore, the step includes determining a target prediction probability of the respective one of multiple solder joint images corresponding to the respective one of the defect labels. Moreover, the step includes adjusting network parameters through the training loss function based on the target prediction probability of the respective one of multiple solder joint images corresponding to the respective one of the defect labels, the transposed K-dimension feature vector of the respective one of defect labels, and the second K-dimension feature vector of the respective one of multiple solder joint images.

Optionally, the training loss function is a Sigmoid cross entropy loss function $$L_s = -\sum_{m=1}^{M} [y_m \log \hat{y}_m + (1 - y_m)\log(1 - \hat{y}_m)]$$

associated with the classification layer, wherein M represents a total number of different types of defect labels, m is an integer varying from 1 to M, $\hat{y}_m$ represents a target prediction probability of the respective one of the multiple solder joint images having a m-th type defect label, $y_m$ represents a preset true probability value of the respective one of multiple solder joint images having the m-th type defect label.

Optionally, the training loss function is a Rank loss function $L_r = \Sigma_{i \in M} \Sigma_{j \in M}[1-Q(i, j)]\max(0,m_0-V_i^T Z+V_j^T Z)$ associated with the classification layer, wherein Q(i, j) represents a predetermined occurrence probability of a solder joint image having both an i-th type of defect label and a j-th type of defect label, i and j are integers varying from 1 to M and not equal, $m_0$ represents a predetermined parameter, $V_i^T$ represents one of the transposed K-dimension feature vector corresponding to the i-th type of defect label, $V_j^T$ represents one of the transposed K-dimension feature vector corresponding to the j-th type of defect label, Z represents one of the second K-dimension feature vector corresponding to a respective one of multiple solder joint images.

Optionally, the training loss function is a linear combination of a Sigmoid cross entropy loss function $L_s$ and a Rank loss function $L_r$ with a weight factor λ. In particular, $$L_s = -\sum_{m=1}^{M} [y_m \log \hat{y}_m + (1 - y_m)\log(1 - \hat{y}_m)],$$

where M represents a total number of different types of defect labels, m is an integer varying from 1 to M, $\hat{y}_m$ represents a target prediction probability of the respective one of the multiple solder joint images having a m-th type defect label, $y_m$ represents a preset true probability value of the respective one of multiple solder joint images having the m-th type defect label;

$L_r = \Sigma_{i \in M}\Sigma_{j \in M}[1-Q(i,j)]\max(0,m_0-V_i^T Z+V_j^T Z),$ where Q(i, j) represents a predetermined occurrence probability of a solder joint image having both an i-th type of defect label and a j-th type of defect label, i and j are integers varying from 1 to M and not equal, $m_0$ represents a predetermined parameter, $V_i^T$ represents one of the transposed K-dimension feature vector corresponding to the i-th type of defect label, $V_j^T$ represents one of the transposed K-dimension feature vector corresponding to the j-th type of defect label, Z represents one of the second K-dimension feature vector corresponding to a respective one of multiple solder joint images.

Optionally, the step of adjusting network parameters includes fixing parameters associated with one of the Sigmoid cross entropy loss function $L_s$ and the Rank loss function $L_r$. The step further includes adjusting network parameters through varying parameters associated with another one of the Sigmoid cross entropy loss function $L_s$ and the Rank loss function $L_r$. Additionally, the step includes obtaining the target feature vectors respectively associated with the multiple solder joint images from the convolutional neural network based on adjusted network parameters. The step also includes iterating a preset number of steps of fixing parameters and adjusting network parameters to obtain the target feature vectors. Furthermore, the step includes fixing parameters associated with one of the Sigmoid cross entropy loss function $L_s$ and the Rank loss function $L_r$ which was used for adjusting network parameters at a latest iteration step. Moreover, the step includes adjusting network parameters through varying parameters associated with the another one of the Sigmoid cross entropy loss function $L_s$ and the Rank loss function $L_r$ which was fixed at the latest iteration step.

Optionally, the step of determining the target prediction probability of the respective one of multiple solder joint images corresponding to the respective one of the defect labels includes determining an initial prediction probability of the respective one of multiple solder joint images corresponding to the respective one of the defect labels based on the respective one of the target feature vectors. The step additionally includes determining the target prediction probability based on the initial prediction probability and a preset occurrence probability of a solder joint image in the training sample set having the respective one of the defect labels.

Optionally, the step of inputting the training sample set to a convolutional neural network to obtain target feature vectors respectively associated with the multiple solder joint images includes obtaining a respective one of initial feature vectors corresponding to the respective one of the multiple solder joint images outputted from a respective convolutional layer of the convolutional neural network based on the training sample set. Additionally, the step includes inputting at least an initial feature vector outputted from a last convolutional layer one-by-one through the feature-enhancement network to a first fully connected layer and a second fully connected layer to obtain the target feature vectors respectively associated with the multiple solder joint images. The first fully connected layer uses at least two different activation functions to perform a convolution operation and the second fully connected layer uses one activation function to perform a convolution operation.

Optionally, the first fully connected layer uses Sigmoid function and tan h function as activation functions. Optionally, the second fully connected layer uses Sigmoid function or Relu function as activation function.

Optionally, the step of inputting the training sample set to a convolutional neural network to obtain target feature vectors respectively associated with the multiple solder joint images further includes inputting a respective one of initial feature vectors outputted from a respective one of different convolutional layers one-by-one to the first fully connected layer and the second fully connected layer to obtain the target feature vectors associated with the multiple solder joint images.

In an alternative aspect, the present disclosure provides a method of detecting solder joint defect. The method includes obtaining a solder joint image of an electronic device having a solder joint, the solder joint image including one solder joint located in a region of interest in a center thereof. The method also includes extracting a target feature vector associated with the solder joint using a convolutional neural network trained according to the method of any one of claims 1 to 8. Additionally, the method includes determining initial prediction probabilities of the solder joint image corresponding to all defect labels based on the target feature vector. Furthermore, the method includes determining that the solder joint of the electronic device has no defect only if none of initial prediction probabilities of the solder joint image corresponding to all defect labels is greater than a threshold value. Moreover, the method includes determining that the solder joint of the electronic device has a defect if one of initial prediction probabilities of the solder joint image corresponding to all defect labels is greater than the threshold value.

Optionally, the step of obtaining a solder joint image of an electronic device having a solder joint includes capturing an initial image of the electronic device based on radiography. The step further includes locating a solder joint region for a respective one of all solder joints in a region of interest of the initial image of the electronic device. Furthermore, the step includes determining an enclosing box of a respective one of all solder joints after binarization of the initial image in the solder joint region by threshold segmentation, wherein the enclosing box forms a solder joint image.

Optionally, the method further includes using a Median filtering or Gaussian filtering to reduce noises in the initial image; using grayscale linear transformation and unsharp mask image to adjust a display contrast of the initial image.

In another aspect, the present disclosure provides an inspection apparatus including an imaging system configured to capture an initial image of an electronic device having a feature element. Additionally, the inspection apparatus includes a computer system including an interface device, a memory device, and a processor. The interface device is configured to electronically couple with the imaging system. The memory device is configured to store image data, control program, image process program, task programs, and network parameters based on which a convolution neural network is built and trained according to a method described herein. The processor is configured to execute the control program to send control instruction via the interface device to the imaging system and receive image data converted from the initial image captured by the imaging system, to execute the image process program to convert the initial image to a feature image using region-of-interest (ROI) location method and store the feature image having a feature element in a center position to the memory device The processor further is configured to execute at least a first task program to extract a target feature vector corresponding to the feature image using the convolutional neural network, at least a second task program to determine an initial prediction probability of the feature image corresponding to a respective one of all defect labels based on the target feature vector, at least a third task program to determine that no defect exists in the feature element of the electronic device only if none of the initial prediction probability of the feature image corresponding to the respective one of all defect labels is greater than a predetermined threshold value, or otherwise, to determine that a defect exists in the feature element of the electronic device.

Optionally, the imaging system includes a radiography imager including a radiation source, a sample desk, and a detector device. The radiation source includes one selected from X-ray source, γ-ray source, e-beam source.

Optionally, the feature image includes an image within an enclosing box that substantially enclosing one feature element of the electronic device in a center of the enclosing box.

Optionally, the electronic device includes a BGA chip. The feature element includes a solder joint.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
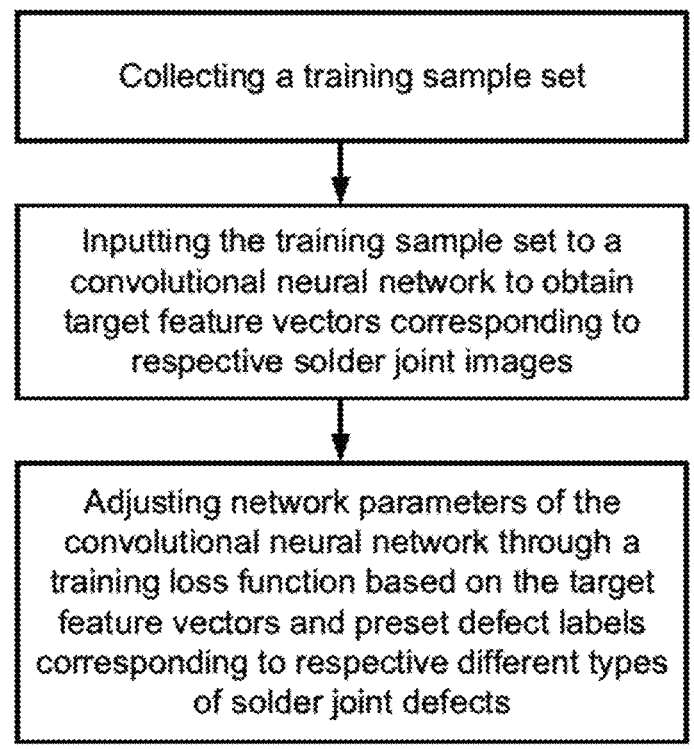
FIG. 1 is a flow chart of a training method for a convolutional neural network according to some embodiments of the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Visual inspection on microdefects in electronic devices based on human experience is not reliable and very low in efficiency. Neural network or particularly Convolutional Neural Network (CNN) can be used to identify and classify all solder joint images of the BGA chip with high efficiency and high reliability. CNN is one of deep study models. A CNN is formed with an input layer, an output layer, and multiple alternate convolutional layers (including nonlinear activation) and pooling layers, as well as fully connected layers. As a feature image size becomes smaller, a number of layers of the feature image becomes larger in the CNN, so that feature vectors of the feature images can be extracted from the CNN and the extracted feature vectors can be classified by a classification operation.

As used herein, the term "neural network" refers to a network used for solving artificial intelligence (AI) problems. A neural network includes a plurality of hidden layers. A respective one of the plurality of hidden layers includes a plurality of neurons (e.g. nodes). A plurality of neurons in a respective one of the plurality of hidden layers are connected with a plurality of neurons in an adjacent one of the plurality of hidden layers. Connects between neurons have different weights. The neural network has a structure mimics a structure of a biological neural network. The neural network can solve problems using a non-deterministic manner.

Parameters of the neural network can be tuned by pre-training, for example, large amount of problems are input in the neural network, and results are obtained from the neural network. Feedbacks on these results is fed back into the neural network to allow the neural network to tune the parameters of the neural network. The pre-training allows the neural network to have a stronger problem-solving ability.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a scale of an input image to one corresponding to a certain convolutional layer. The output from the up-sampling layer or the down-sampling layer can then be processed by a convolutional layer of a corresponding scale. This enables the convolutional layer to add or extract a feature having a scale different from that of the input image.

By pre-training, parameters include, but are not limited to, a convolutional kernel, a bias, and a weight of a convolutional layer of a convolutional neural network can be tuned. Accordingly, the convolutional neural network can be used in various applications such as image recognition, image feature extraction, and image feature addition.

As used herein, the term "convolutional kernel" refers to a two-dimensional matrix used in a convolution process. Optionally, a respective one item of a plurality items in the two-dimensional matrix has a certain value.

As used herein, the term "convolution" refers to a process of processing an image. A convolutional kernel is used for a convolution. For, each pixel of an input image has a value, a convolution kernel starts at one pixel of the input image and moves over each pixel in an input image sequentially. At each position of the convolutional kernel, the convolutional kernel overlaps a few pixels on the image based on the size of the convolution kernel. At a position of the convolutional kernel, a value of one of the few overlapped pixels is multiplied by a respective one value of the convolutional kernel to obtain a multiplied value of one of the few overlapped pixels. subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolution kernels. In another example, a convolution process may add more features to the input image using different convolution kernels.

As used herein, the term "convolutional layer" refers to a layer in a convolutional neural network. The convolutional layer is used to perform convolution on an input image to obtain an output image. Optionally, different convolution kernels are used to performed different convolutions on the same input image. Optionally, different convolution kernels are used to performed convolutions on different parts of the same input image. Optionally, different convolution kernels are used to perform convolutions on different input images, for example, multiple images are inputted in a convolutional layer, a respective convolutional kernel is used to perform a convolution on an image of the multiple images. Optionally, different convolution kernels are used according to different situations of the input image.

As used herein, the term "down-sampling" refers to a process of extracting features of an input image, and outputting an output image with a smaller scale.

As used herein, the term "pooling" refers to a type of down-sampling. Various methods may be used for pooling. Examples of methods suitable for pooling includes, but are not limited to, max-pooling, avg-polling, decimation, and demuxout.

In order to better identify solder joint image and enhance accuracy of the identification, a CNN to be applied for inspecting solder joint images needs to be trained repeatedly to adjust corresponding network parameters of the CNN. Accordingly, the present disclosure provides, inter alia, a training method for CNN, a method for detecting defect using the trained CNN, and an inspection apparatus having the same that substantially obviate one or more of the problems due to limitations and disadvantages of the related art.

In one aspect, the present disclosure provides a training method for the convolutional neural network (CNN). A training method of CNN includes data-transmission in forward direction and error-transmission in backward direction. The data-transmission is to input a training sample set (of data) into the CNN. Then, target feature vectors of the training sample set can be calculated layer-by-layer based on current network parameters and operation form of the CNN. The error-transmission is to generate error based on a Loss function used for supervision of the CNN and transmit backward layer-by-layer through the CNN to update corresponding network parameters.

Figure 2:
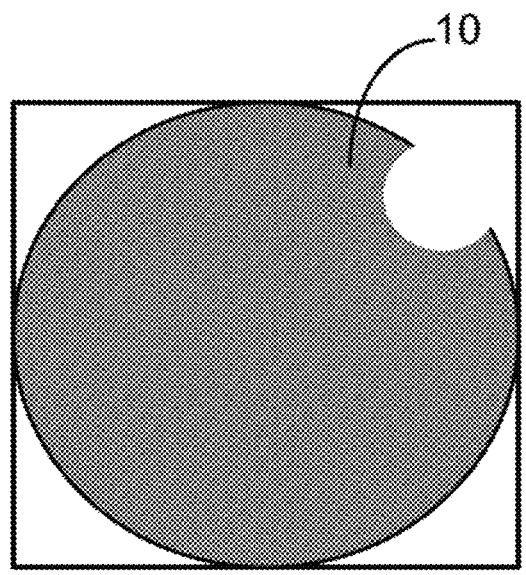
FIG. 2 is a schematic diagram of a sample solder joint image according to an embodiment of the present disclosure.

FIG. 1 is a flow chart of a training method for a convolutional neural network according to some embodiments of the present disclosure. Referring to FIG. 1, the training method includes a step of collecting a training sample set. In an embodiment, the training sample set includes multiple solder joint images. FIG. 2 shows a schematic diagram of a sample solder joint image according to an embodiment of the present disclosure. The sample solder joint image is an image of a solder joint 10 substantially located at a center region. The solder joint may have at least one of different types of defects. Optionally, the sample solder joint image is one of multiple images having a solder joint in a BGA chip with at least one of different types of defects. Typical types of defects for the solder joints occurred during the BGA chip manufacture process includes bubbles, bridging defects, irregular sizes, and cold joints.

Based on a large quantity of solder joint images having different types of defects, a training sample set containing a proper number of solder joint images containing one or more defects can be selected for the use of training the CNN. Optionally, for a better training of the CNN, each solder joint image selected into the training sample set may include any two different types of defects.

Additionally, referring to FIG. 1, the training method further includes a step of inputting the training sample set into the CNN to extract target feature vectors respectively associated with multiple solder joint images in the training sample set. Optionally, the CNN can be one selected from AlexNet Convolutional Neural Network, VGG Convolutional Neural Network, and GoogleNet Convolutional Neural Network as a master network for extracting the target feature vectors. In particular, a target feature vector extracted from a GoogleNet CNN can be a 2048-dimension vector. A target feature vector extracted from an AlexNet CNN or a VGG CNN can be a 4096-dimension vector.

Additionally, the training method of FIG. 1 includes a step of adjusting network parameters characterizing the convolutional neural network through a training loss function based on the target feature vectors and pre-labeled defect labels corresponding to different types of defects. Optionally, the training loss function includes one loss function or a weighted linear combination of at least two different loss functions. In the CNN, different types of defects have been pre-labeled with corresponding defect labels. For example, a label of solder-joint bubble is classified as a first type of defect label, a label of solder-joint bridge is classified as a second type of defect label, a label of solder-joint size irregularity is classified as a third type of defect label, and a label of cold joint is classified as a fourth type of defect label. Optionally, the training loss function can be a cross-correlation matrix loss function such as a Sigmoid cross entropy loss function. Optionally, the training loss function can be a Rank loss function using word2vec method for determining a normalized K-dimension feature vector based on the transposed K-dimension feature vector corresponding to the respective one of the different types of defect labels. Optionally, the training loss function may contain three different loss functions, depending on applications.

Figure 3:
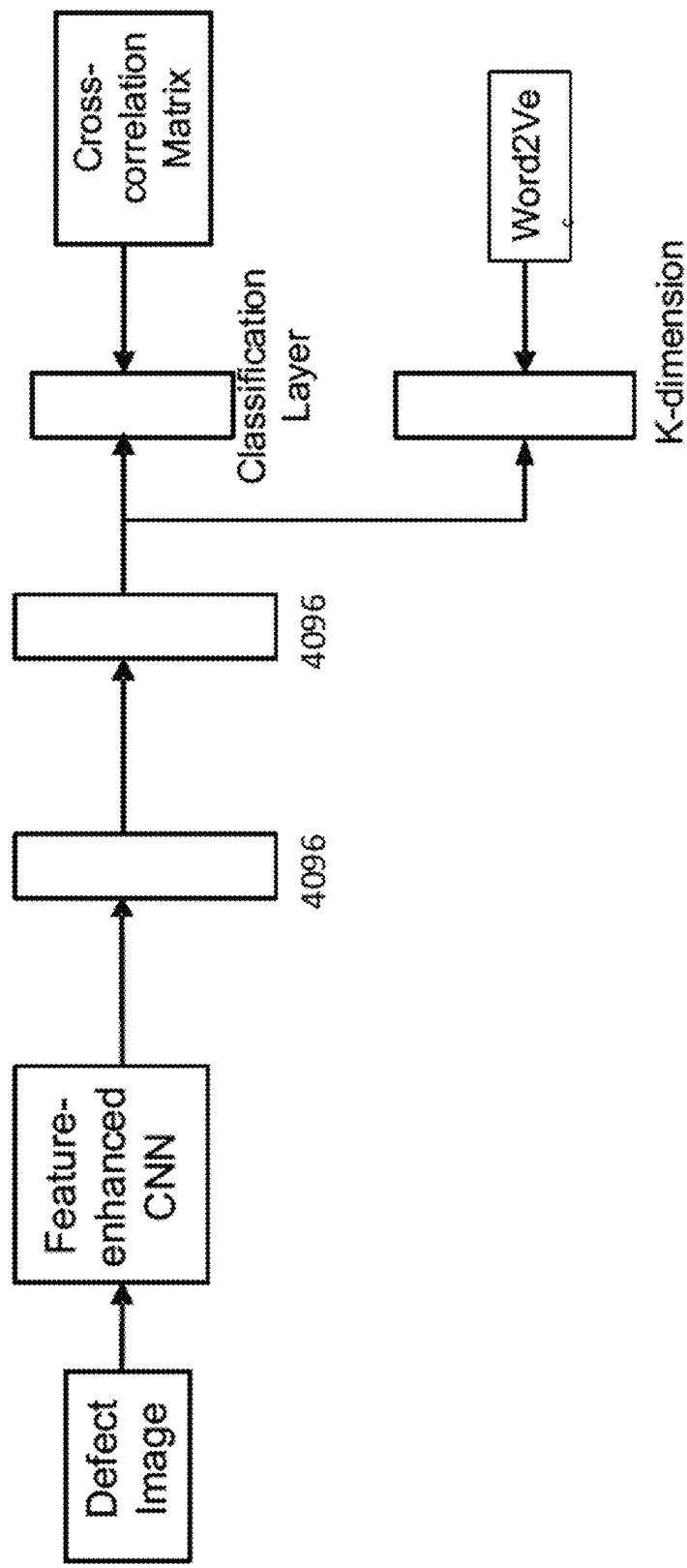
FIG. 3 is a schematic diagram of a feature-enhanced convolutional neural network followed by a classification layer according to some embodiments of the present disclosure.

The training method according to embodiments of the present disclosure selects multiple solder joint images as a training sample set for extracting target feature vectors associated with the multiple solder joint images. The training method uses a training loss function in a classification layer following the CNN to adjust network parameters. FIG. 3 shows a schematic diagram of a CNN followed by a classification layer employed only for training the CNN. In an example shown in FIG. 3, the CNN to be trained is a feature-enhanced convolutional neural network receiving sample set including multiple solder joint images and is configured to output target feature vectors in multiple layers of 4096-dimensionality respectively associated with the multiple solder joint images. The classification layer is configured to receive the target feature vectors corresponding to different types of defects and use a training loss function to train the CNN based on the target feature vectors and pre-labeled defect labels corresponding to different types of solder joint defects. Optionally, in the classification layer, a cross-correlation probability matrix M*M is deduced for M types of defect labels in the sample set to describe mutual correlation between any two defect labels, which is used to adjust probability of a respective defect label in the M-types of defect labels. Then a Sigmoid cross entropy loss function can be used to adjust network parameters based on the adjusted probability of the respective defect labels. Optionally, an enhanced classification learning is achieved by using semantic relationships between defect labels. For example, word2vec method can be employed to convert each defect label to a normalized K-dimensional vector $V_{label}$. A feature vector outputted from the last layer of 4096-dimensionality is reduced to Z (i.e., a normalized K-dimension vector) for defining a new loss function to compliment the cross-correction between defect labels. In an example, a Rank loss function is used for implementing word2vec method.

Optionally, the training method uses a training loss function containing at least two different loss functions in the classification layer shared by the convolutional neural network. Each loss function is complimentary to other loss function during the CNN training steps. For example, parameters of a first loss function can be fixed and parameters of a second loss function are adjusted in a step of training the CNN. A certain number of training steps are iterated before alternately fixing the parameters of the second loss function while adjusting parameters of the first loss function. The alternate training scheme is further enhancing the training of the CNN. Based on the extracted target feature vectors and pre-labeled defect labels corresponding to different types of defects, the network parameters associated with the convolutional neural network are adjusted during the repeated training process. Since the solder joint defects in the solder joint images have minor differences, the training method described herein can enhance correlation of different defect types in the CNN. When the trained CNN is applied to inspect solder joints, it can substantially enhance accuracy of classification of different types of defects, thereby enhancing defect inspection efficiency and accuracy and reducing labor cost.

Furthermore, in a specific embodiment, the step of inputting the training sample set includes a sub-step of obtaining an initial feature vector corresponding to a respective one of the multiple solder joint images through a respective one of all convolution layers. Convolutional layers apply a convolution operation to the input, passing the result to the next layer. Finally, after several convolutional and max-pooling layers, high-level reasoning in the convolutional neural network is done via fully connected layers. Neurons in a fully connected layer have connections to all activations in the previous layer. At least during execution of the sub-step, an initial feature vector outputted from a last convolutional layer is one-by-one inputted into a first fully connected layer and a second fully connected layer to obtain the respective target feature vector of the respective one of solder joint images. In the embodiment, the first fully connected layer uses at least two activation functions and the second fully connected layer uses one activation function. Additionally, in a specific implementation, the first fully connected layer uses Sigmoid function and tan h function as activation function. The second fully connected layer uses Sigmoid function or relu function as activation function.

Figure 4:
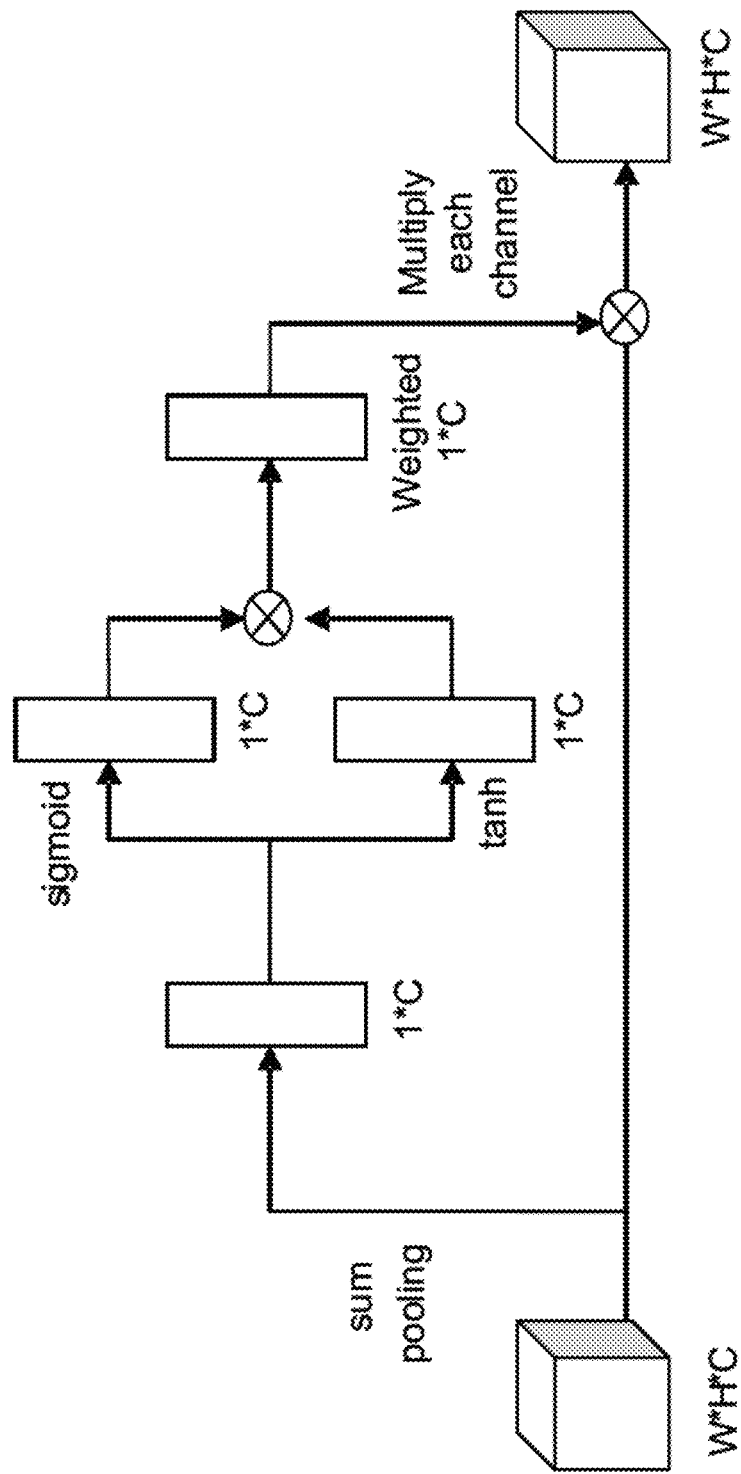
FIG. 4 is a schematic diagram of a feature enhancement network associating with a convolutional layer according to an embodiment of the present disclosure.

Optionally, the CNN of FIG. 3 is a feature-enhanced CNN in which a feature-enhancement network is followed with each convolutional layer. FIG. 4 shows a schematic diagram of a feature enhancement network associating with a convolutional layer according to an embodiment of the present disclosure. Referring to FIG. 4, the feature enhancement network is inserted to receive a three-dimension feature vector W*H*C outputted from a respective convolutional layer of the CNN, where W*H represents a size of a feature map formed via an initial feature vector, W represents a width of the feature map, H represents a height of the feature map, and C represents number of channels in the convolutional layer that outputs the three-dimension feature vector W*H*C. After through sum-pooling of the three-dimension feature vector W*H*C, a C-dimension feature vector 1*C is obtained. The C-dimension feature vector 1*C is outputted via two paths of activation functions to separate different effects of different channels. One path uses a Sigmoid function through a first fully-connected layer and another path uses tan h function through a second fully connected layer. Optionally, the first fully connected layer uses Sigmoid function and tan h function as activation functions. Optionally, the second fully connected layer uses Sigmoid function or Relu function as activation function. An enhanced C-dimension feature vector is outputted. Then, the enhanced C-dimension feature vector is further to multiply with the initial three-dimension feature vector to obtain a new three-dimension feature vector W*H*C for a next layer in the CNN. Eventually the final target feature vector is outputted from a last feature-enhancement network following the last convolutional layer of the CNN.

As an example where a VGG16 type of CNN is employed for identifying and inspecting defects in a plurality of feature images. The VGG16 CNN includes five stages, Stage1, Stage2, Stage3, Stage4, and Stage5, connected together. Each stage includes one max-pooling layer and one or more convolution layers. For example, one of the first stage, Stage1, is associated with an input image characterized by a three-dimension volume of W*H*C=224*224*3. The Stage1 includes 2 convolution layers of conv3-64 and one max-pooling layer, outputting a stage-1 feature characterized by a volume of 112*112*64. Stage2 receives the input of the stage-1 feature of 112*112*64 and includes 2 convolution layers of conv3-128 and one max-pooling layer, outputting a stage-2 feature characterized by a volume of 56*56*128. Stage3 received the input of the stage-2 feature of 56*56*128 and includes 3 convolution layers of conv3-256 and one max-pooling layer, outputting a stage-3 feature characterized by a volume of 28*28*256. Stage4 receives the input of the stage-3 feature of 28*28*256 and includes 3 convolution layers of conv3-512 and one max-pooling layer, outputting a stage-4 feature characterized by a volume of 14*14*512. Stage5 receives the input of the stage-4 feature of 14*14*512 and includes 3 convolution layers of conv3-512 and one max-pooling layer, outputting final feature image characterized by a volume of 7*7*512.

Optionally, in some embodiments, each initial feature vector outputted from each convolutional layer is one-by-one inputted to the first fully connected layer and the second fully connected layer to obtain target feature vectors respectively associated with the multiple solder joint images provided in the training sample set.

In a specific embodiment, the step of adjusting network parameters includes a sub-step of converting a respective one of the defect labels to a first K-dimension feature vector and transposing the first K-dimension feature vector, i.e., determining a transposed K-dimension feature vector corresponding to the respective one of the defect labels. Further, the step includes another sub-step of reducing dimensionality of a respective one of the target feature vectors corresponding to a respective one of the multiple solder joint images to a second K-dimension feature vector. Furthermore, the step includes yet another sub-step of determining a target prediction probability of the respective one of multiple solder joint images corresponding to the respective one of the defect labels based on the target feature vectors respectively associated with the multiple solder joint images. Here, K is a positive integer selected based on application. Optionally, the K-dimension feature vector corresponding to each defect label can be a K-dimension feature vector after normalization. Optionally, converting a defect label to a vector can be performed using a word2vec method, though other methods can be employed. In a specific implementation, a 4096-dimension feature vector corresponding to a respective one solder joint image is subjected to a fully-connected dimensionality reduction to yield a K-dimension feature vector. Optionally, this K-dimension feature vector corresponding to the respective one of multiple solder joint imagers can be a K-dimension feature vector after normalization. Of course, other methods can be used to reduce dimensionality of the target feature vector to a K-dimension feature vector.

Additionally, the sub-step of determining a target prediction probability of the respective one of multiple solder joint images corresponding to the respective one of the defect labels based on the target feature vectors respectively associated with the multiple solder joint images further includes determining an initial prediction probability of a respective one solder joint image corresponding to a respective one type of defect labels based on the obtained target feature vector. In particular, at the last layer output of a classification operation, the initial prediction probability $\hat{y}_m$ of the respective one of multiple solder joint images corresponding to the respective one of the defect labels can be determined based on a formula $$\hat{y}_m = \frac{1}{1+e^{-\delta^T X}},$$

where M represents a total number of different types of defect labels, m is an integer belonging to M, $\hat{y}_m$ represents an initial prediction probability of the solder joint image having a m-th type defect label, S represents a vector containing the network parameters of the CNN, $\delta^T$ represents a transposed vector of the network parameters, X represents target feature vector. If the types of defect labels include solder joint bubble, solder joint bridge, solder joint size irregularity, and cold joint, then M can be a set of defect labels including a first type of defect label, a second type of defect label, a third type of defect label, and a fourth type of defect label.

Based on the determined initial prediction probability of the respective solder joint image corresponding to the respective one of different types of defect labels and a target occurrence probability of a solder joint image in the preset training sample set having two different types of defect labels, a target prediction probability of a respective solder joint image corresponding to a respective one defect label can be determined. Here, the occurrence probability of a solder joint image in the preset training sample set having two different types of defect labels means the occurrence probability of a solder joint image having both an i-th type defect label and a j-th type of defect label at the same time, here i varies from 1 to M and j varies from 1 to M but i≠j.

In general, an initial prediction probability of one type of defect will be affected by the initial prediction probabilities of all other types of defects. The obtained initial prediction probability is then adjusted, based on the adjusted target prediction probability, the network parameters can be adjusted using one or more training loss functions. In particular, the target prediction probability $\hat{y}_m'$ of the respective solder joint image corresponding to the respective one type of defect label can be determined using the following formula:

$$\hat{y}_m' = \min\left[1, \alpha_1 \hat{y}_m + \alpha_2 \frac{1}{M-1}\left(\sum_{k=1}^{m-1} P(m/k) + \sum_{k=m+1}^{M} P(m/k)\right)\right],$$

where, $$P(m/k) = \frac{Q(m,k)}{\hat{y}_k}, \quad Q(m,k) = \frac{n(m,k)}{N}, \quad M$$

represents a total number of all different types of defect labels, $\hat{y}_m$ represents an initial prediction probability of a solder joint image having a m-th type of defect label, $\hat{y}_m'$ represents a target prediction probability of a solder joint image having a m-th type of defect label, m is an integer varying from 1 to M and k is an integer varying from 1 to M and k≠m, $\hat{y}_k$ represents an initial prediction probability of a solder joint image having a k-th type of defect label, N represents a total number of multiple solder joint images in the training sample set, Q(m, k) represents a predetermined occurrence probability of a solder joint image having both a m-th type of defect label and a k-th type of defect label, n(m, k) represents a total number of solder joint images having both m-th type of defect label and k-th type of defect label at the same time, $\alpha_1 \in (0.5,1)$, $\alpha_2 \in (0,0.5)$.

In the specific embodiment, the sub-step of adjusting network parameters includes adjusting the network parameters through the training loss function based on the target prediction probability of the respective one of multiple solder joint images corresponding to the respective one of the defect labels, the transposed K-dimension feature vector of the respective one of defect labels, and the second K-dimension feature vector of the respective one of multiple solder joint images. In particular, the training loss function includes at least two different loss functions. In a case that the training loss function consists of two different loss functions, the two different loss functions are Sigmoid cross entropy loss function and Rank loss function. In the embodiment, the training loss function L used for training the convolutional neural network is given by:

$$L = L_s + \lambda L_r;$$

where, $\lambda$ represents a weight coefficient used to weigh the proportion of $L_s$ and $L_r$, $L_s$ represents Sigmoid cross entropy loss function and $L_r$ represents Rank loss function.

Sigmoid cross entropy loss function $L_s$ is expressed as:

$$L_s = -\sum_{m=1}^{M} [y_m \log \hat{y}_m + (1-y_m)\log(1-\hat{y}_m)];$$

where M represents a total number of different types of defect labels, m is an integer belonging to M, $\hat{y}_m$ represents a target prediction probability of a solder joint image having a m-th type of defect label, $y_m$ represents a pre-labeled true value of a solder joint image having a m-th type of defect label. When the solder joint image has a m-th type of defect label, $y_m=1$; When the solder joint image has no m-th type of defect label, $y_m=0$.

Rank loss function $L_r$ is expressed as:

$$L_r = \Sigma_{i \in M} \Sigma_{j \in M} [1-Q(i,j)] \max(0, m_0 - V_i^T Z + V_j^T Z);$$

where M represents a total number of different types of defect labels, Q(i, j) represents a predetermined occurrence probability of a solder joint image having both an i-th type of defect label and a j-th type of defect label, Q(i, j)=n(i, j)/N, n(i, j) represents a total number of solder joint images that have both the i-th type of defect label and the j-th type of defect label, N represents a total number of the multiple solder joint images in the training sample set; $m_0$ represents a predetermined parameter; $V_i^T$ represents a transposed K-dimension feature vector of the i-th type of defect label; $V_j^T$ represents a transposed K-dimension feature vector of the j-th type of defect label; and Z represents a K-dimension feature vector corresponding to a respective one solder joint image.

$L_s$ and $L_r$ share the backbone network of convolutional neural networks. In an implementation of the training method, it can train the convolutional neural network through both $L_s$ and $L_r$ at the same time. Or, it can fix parameters of one loss function of the $L_s$ and $L_r$ while train the convolutional neural network through another loss function of the $L_s$ and $L_r$. Then, after a certain number of iterations, an alternate loss function of the $L_s$ and $L_r$ is used for training. Using different loss functions alternatively provides a better way to train the convolutional neural network. In particular, the training method of the present disclosure executes a step first to fix parameters of the loss function $L_s$, and adjust network parameters of the CNN through the loss function $L_r$. After a predetermined number of iterations, the training is executing another step to use the loss function $L_s$ to adjust the network parameters again. Or, the training method of the present disclosure executes a step first to fix parameters of the loss function $L_r$, and adjust network parameters of the CNN through the loss function $L_s$. After a predetermined number of iterations, the training is executing another step to use the loss function $L_r$ to adjust the network parameters again. Here, the predetermined number of iterations for adjusting network parameters using either one of the $L_s$ and $L_r$ while fixing the other one can be based on experience that may vary in different applications.

In an implementation of the method for training a convolutional neural network for inspecting a BGA chip to detect defects of multiple solder joints thereof. The method includes collecting a training sample set including multiple solder joint images. The multiple solder joint images include solder joint images having at least two of some typical solder joint defect types selected from bubble, bridge, size irregularity, and cold joint. Then the method including inputting the training sample set into the convolutional neural network to obtain a 4096-dimension initial feature vector corresponding to a respective one of the multiple solder joint images through a respective convolutional layer. Then, the 4096-dimension initial feature vector outputted from the respective convolutional layer is one-by-one inputted to a first fully connected layer and a second fully connected layer so that a target feature vector corresponding to the respective one of the multiple solder joint images can be obtained. In this implementation, the first fully connected layer uses a Sigmoid function and a tan h function as activation functions to combine effects of different channels between layers. The second fully connected layer uses Sigmoid function as activation function. Additionally, the method includes adopting word2vec method to convert a respective one of different types of defect labels to a respective K-dimension feature vector which is further transposed to a transposed K-dimension feature vector. The method includes determining a normalized K-dimension feature vector based on the transposed K-dimension feature vector corresponding to the respective one of the different types of defect labels. Furthermore, the method includes reducing dimensionality of the 4096-dimension feature vector of the respective one solder joint image to a normalized K-dimension feature vector of the respective one type of defect label.

Based on the formula, $$\hat{y}_m = \frac{1}{1 + e^{-\delta^T x}},$$

an initial prediction probability $\hat{y}_m$ of a respective solder joint image corresponding to a respective m-th type of defect label can be determined. Then, based on the following formula: IDC-36E $$\hat{y}'_m = \min\left[1, \ \alpha_1 \hat{y}_m + \alpha_2 \frac{1}{M-1}\left(\sum_{k=1}^{m-1} P(m/k) + \sum_{k=m+1}^{M} P(m/k)\right)\right],$$

a target prediction probability $\hat{y}_m'$ of a respective solder joint image corresponding to a respective m-th type of defect label can be determined.

Moreover, the method includes adjusting network parameters associated with the convolutional neural network through a hybrid training loss function $L=L_s+\lambda L_r$. In specific, the method includes firstly fixing parameters of a first function $L_s$ and adjusting the network parameters using a second function $L_r$. After a certain number of iterations, the method includes fixing parameters of the second function $L_r$ and adjusting the network parameters again using the first function $L_s$.

Figure 5:
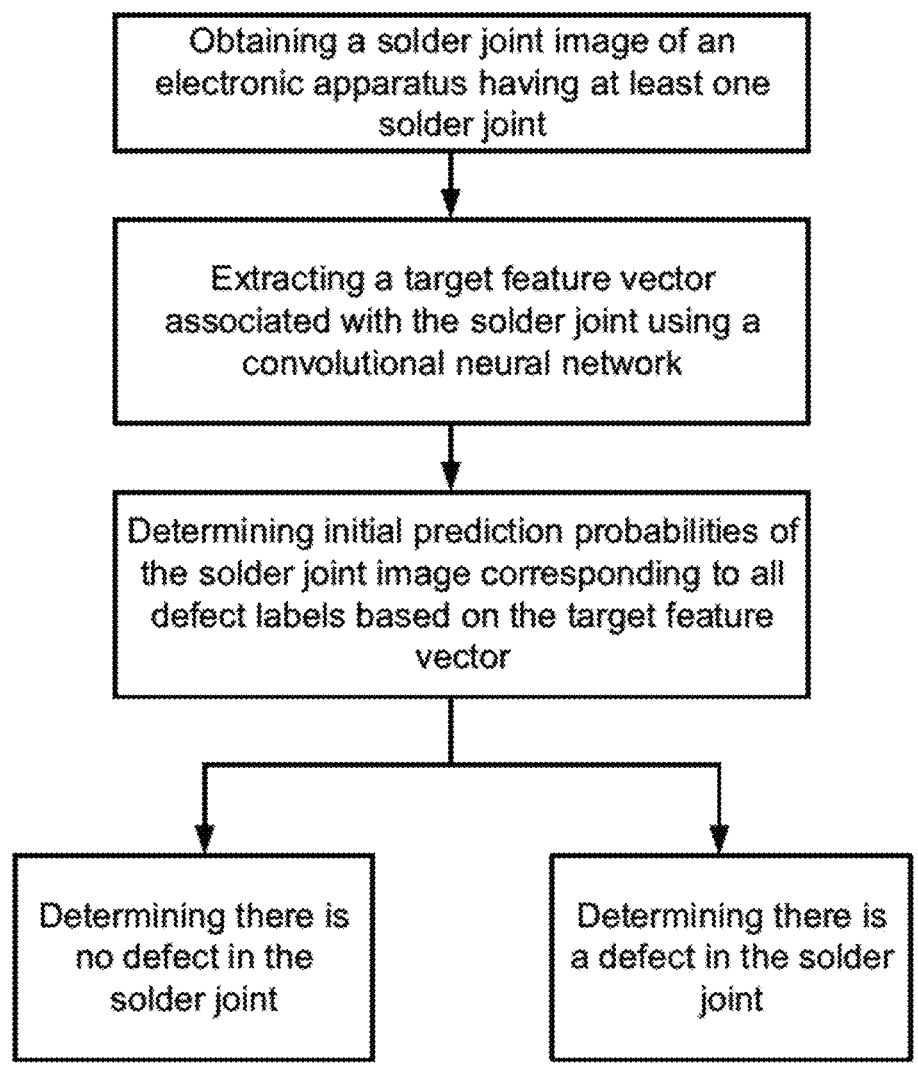
FIG. 5 is a flow chart of a method for detecting solder joint defect according to an embodiment of the present disclosure.

In another aspect, the present disclosure provides a method of defecting a solder joint defect. FIG. 5 shows a flow chart of a method of detecting a solder joint defect according to an embodiment of the present disclosure. Referring to FIG. 5, the method includes a step of capturing a solder joint image of an electronic device having one or more feature elements. Optionally, the solder joint image includes at least one solder joint located in a center region of the image. Further, the method includes extracting a target feature vector of the solder joint image from a convolutional neural network which is a feature-enhanced CNN pre-trained according to the training method described herein (see FIGS. 1, 3, and 4 and descriptions above). Additionally, the method includes determining an initial prediction probability of the solder joint image corresponding to the respective one of different types of defect labels (predetermined for the solder joints of electronic device and likely occurred during its manufacture process) based on the extracted target feature vector.

The method further includes determining that the electronic device has no solder joint defect only if none of the respective one initial prediction probabilities of the feature image respectively corresponding to all types of defect labels is greater than a preset threshold value. The threshold value can be empirically obtained. Otherwise, the method includes determining that the electronic device has at least one solder joint defect.

This method relies on the convolutional neural network that is trained based on the disclosed training method to extract the target feature vector of the solder joint image.

Additionally, the method utilizes the extracted target feature vector to determine the initial prediction probability of the solder joint image corresponding to a respective one of all different types of defect labels so that the accuracy of the initial prediction probability is enhanced over conventional human effort. Thus, only when none of the determined initial prediction probabilities respectively corresponding to the all types of defect labels is greater than the preset threshold value, the electronic device can be determined to be defect free in its solder joints, i.e., the electronic device is qualified. When at least one initial prediction probability of one type of defect label is greater than the preset threshold, the electronic device can be determined to have a defect in at least one solder joint. Then the electronic device is disqualified. The inspection accuracy is enhanced.

Figure 6:
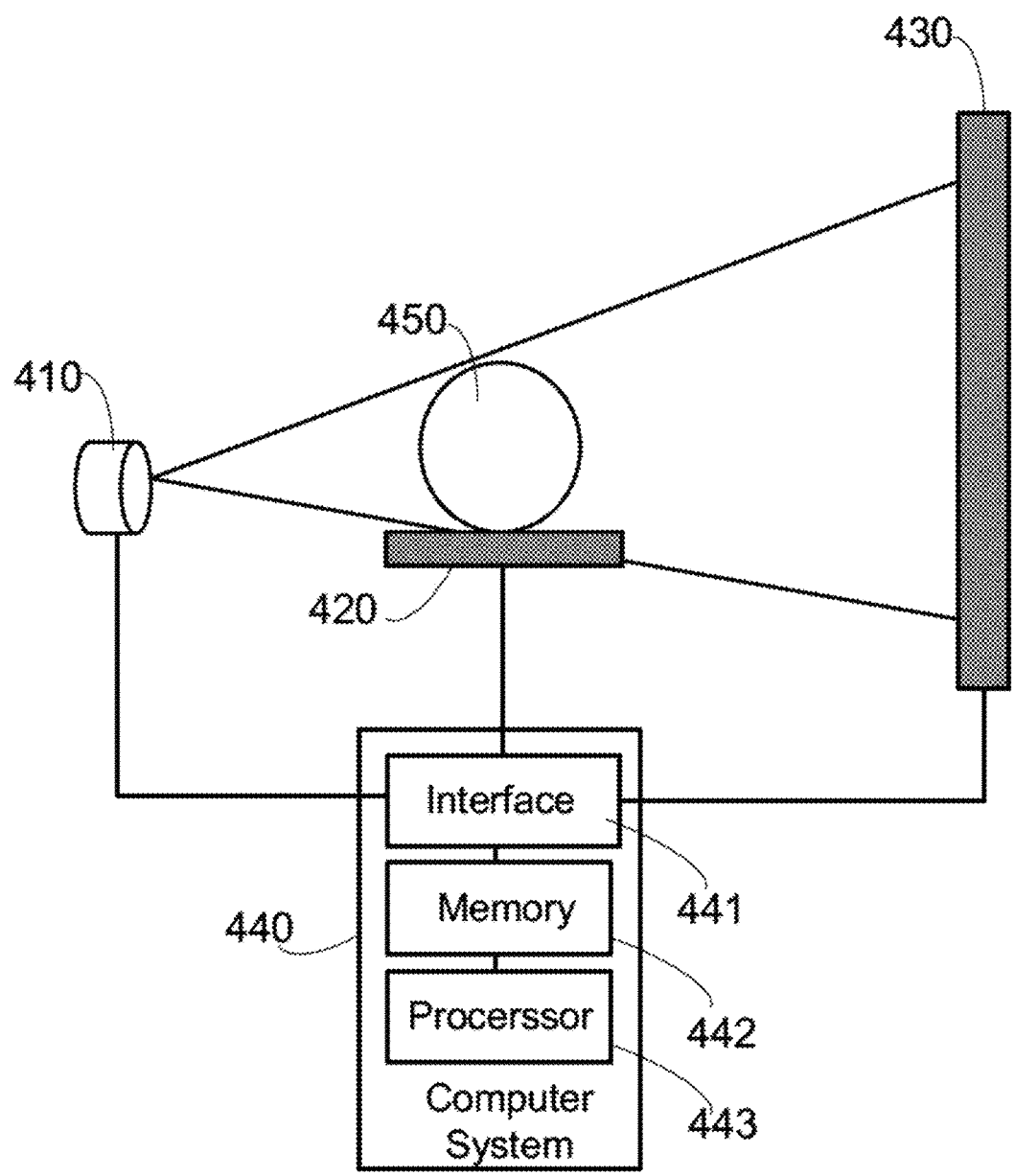
FIG. 6 is a simplified diagram of a radiography imaging system according to an embodiment of the present disclosure.

In a specific application, the electronic device includes a BGA chip having one or more feature elements such as solder joints with sizes in micrometer scale. In order to detect any micro defects in the feature element such as solder joint bubble, solder joint bridge, size irregularity, cold joint, a proper image of the BGA chip needs to be captured. Optionally, radiography imaging technique is used to capture an initial image of the BGA chip. FIG. 6 shows a simplified diagram of a radiography imaging system according to an embodiment of the present disclosure. Referring to FIG. 6, a radiography imaging system includes a source 410 providing electromagnetic radiation, a supporting desk 420 for placing a sample BGA chip 450 thereon, a detector 430 to collect image data, and a computer system 440 having an interface device 441, a memory device 442, and a processor 443 coupled to the source 410, the supporting desk 420 and the detector 430.

Figure 7:
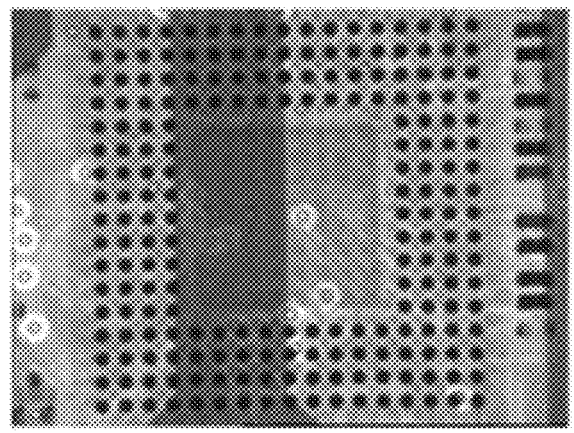
FIG. 7 is an exemplary diagram of an initial image of a BGA chip by radiography imaging system according to an embodiment of the present disclosure.

Optionally, the source 410 of the radiography imaging system can be an X-ray source, or a γ-ray source, or an e-beam source or other radiation sources. Optionally, the source 410 is driven by control signals/instructions based on preset control programs to provide a proper dose of electromagnetic radiation toward the sample BGA chip 450 on the supporting desk 420. Optionally, the supporting desk 420 is equipped with a robot handler to load and unload the sample BGA chip 450 one by one through an inspection process for a large quantity of manufactured electronic devices. The supporting desk 420 is also controlled by the preset control programs during the inspection process. Optionally, the detector 430 comprises various image sensors configured to detect the radiations passed through the sample BGA chip 450 and convert to image data. FIG. 7 shows an example of an initial image of a BGA chip displayed using the image data captured by the imaging system.

Optionally, the interface device 441 of the computer system 440 is configured to electronically couple respectively with the source 410, the supporting desk 420, and the detector 430 of the imaging system. Optionally, the memory device 442 is configured to store image data, control program, image process program, task programs, and network parameters based on which a convolution neural network is built and trained according to the training method described herein (see FIG. 1 and descriptions throughout the specification). Optionally, the processor 443 of the computer system 440 is configured to execute the control program to send control signals/instructions via the interface device 441 to the imaging system. Based on the control signals/instructions, the imaging system controls loading/unloading a sample BGA chip 450 to/from the supporting desk 420 before/after image capture, controls driving the source 410 to illuminate a certain dose of electromagnetic radiation to the sample BGA chip 450 on the desk 420, and controls the detector 430 to collect image data. Further, the processor 443 is configured, also through the interface device 441, to receive the image data converted from an initial image (FIG. 7) of the sample BGA chip captured by the imaging system. The image data can be stored in the memory device 442. Optionally, the processor is configured to execute the image process program to convert the image data of the initial image to one or more feature images using region-of-interest (ROI) location method and store each feature image having a feature element (such as a solder joint) in a center region of an enclosing box defining the feature image. The feature image having one feature element like solder joint of the BGA chip can be stored to the memory device 442. Optionally, the feature image is processed to reduce noise using a Median filtering method or Gaussian filtering method. Optionally, the feature image is processed to enhance contrast using grayscale linear transformation and unsharp mask image method.

Additionally, the processor 443 of the computer system 440 is configured to execute at least a first task program stored in the memory device 442 to extract a target feature vector corresponding to the feature image using the convolutional neural network (CNN). The CNN has been trained beforehand based on a training sample set including multiple images having at least two of different types of defect labels classified for the defect types associated with the solder joints of the BGA chip using the training method described in FIG. 1. Furthermore, the processor 443 is configured to execute at least a second task program to determine an initial prediction probability of the feature image corresponding to a respective one of all defect labels based on the target feature vector. Moreover, the processor 443 is configured to execute at least a third task program to determine that no defect exists in the solder joint of the BGA chip only if none of the initial prediction probability of the feature image corresponding to the respective one of all defect labels is greater than a predetermined threshold value. Or otherwise, the processor 443 is to determine that at least one defect exists in the solder joint of the BGA chip.

Optionally, the feature image is a region of the initial image, i.e., a region-of-interest selected from the initial image. Using the ROI location method to select the feature image containing a solder joint can reduce image processing time and enhance inspection accuracy. After the initial image of a BGA chip is captured (FIG. 7), the initial image in the solder joint area is binarized by a threshold segmentation method to determine an enclosing box for each solder joint. Each enclosing box then forms a solder joint image. A standard BGA chip can be divided to a matching area A and a solder joint area B. The matching area A is an area with unique characteristics defined in the standard BGA chip and can be used as a template image T for matching part of an initial image S of an arbitrary BGA chip for identifying the matching area A therein. The solder joint area B is just the area in which a solder joint locates. Matching area A and solder joint area B have a preset relative positional relationship. Once the matching area A is determined, the solder joint area B of the arbitrary BGA chip can also be directly determined to yield a solder joint image.

Figure 8:
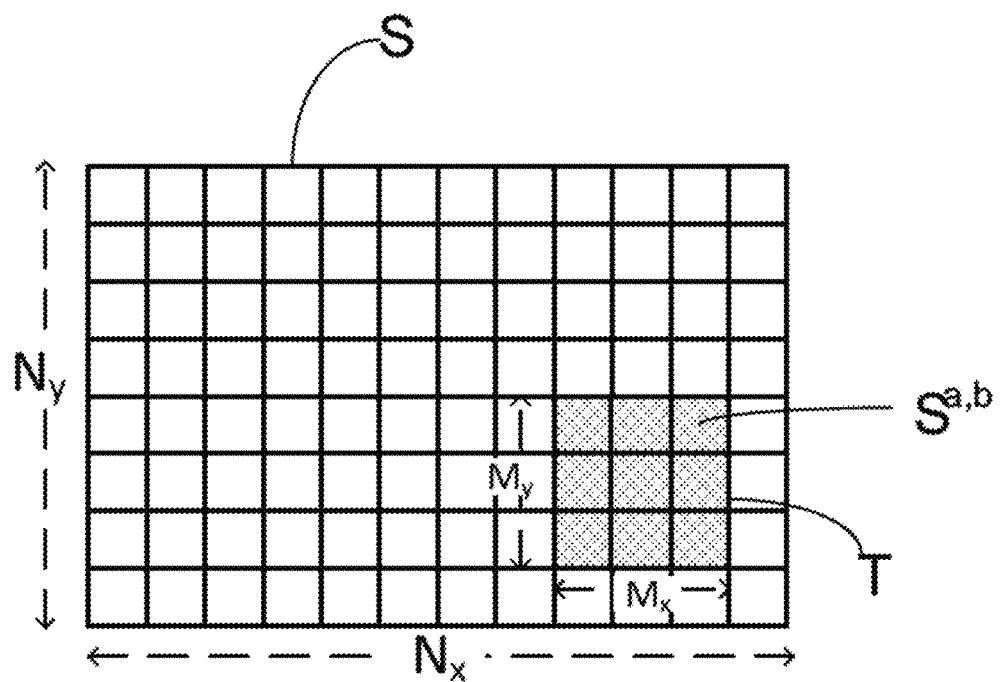
FIG. 8 is a schematic diagram of capturing a solder joint image from a BGA chip image according to an embodiment of the present disclosure.

The ROI location method can be illustrated in the following example. FIG. 8 shows a schematic diagram of capturing a solder joint image from a BGA chip initial image according to an embodiment of the present disclosure. Referring to FIG. 8, the initial image S of a BGA chip having a size of $N_x \times N_y$ is subjected for matching by parallel movement of a template image T having a size of $M_x \times M_y$.

A searching sub-image $S^{a,b}$ represents a sub-region of the initial image where (a, b) represent coordinates of an upper-left corner point in the initial image S as a reference point, with a restriction of $1 \le a \le N_x-M_x+1$, $1 \le b \le N_y-M_y+1$. A normalized cross-correlation coefficient R(a, b) between the sub-image $S^{a,b}$ and the template image T can be obtained by:

$$R(a, b) = \frac{\sum_{m=1}^{M} \sum_{n=1}^{N} [S^{a,b}(m, n) * T(m, n)]}{\sqrt{\sum_{m=1}^{M} \sum_{n=1}^{N} [S^{a,b}(m, n)]^2} * \sqrt{\sum_{m=1}^{M} \sum_{n=1}^{N} [T(m, n)]^2}};$$

where, R(a, b) is bigger means correlation is stronger. In other words, when R(a, b) reaches maximum, T and $S^{a,b}$ are considered being matched. Accordingly, a matching area A in the initial image S can be determined based on the coordinates of the matched $S^{a,b}$. Then, the solder joint area B can be determined based on preset relative positional relationship with the matching area A. This solder joint area B is just the ROI area determined by the ROI location method. In this way, solder joint images for all solder joints in the BGA chip can be obtained.

Additionally, each solder joint image includes a feature element which is a solder joint surrounded by a background. Using a threshold segmentation method, a binarization image of the solder joint image can be deduced to give a boundary between the solder joint and background based on distinct grayscale level difference. An enclosing box associated with the boundary of the solder joint is thus determined, namely, the enclosing box with a simple geometric shape forms a closed region that encloses one solder joint. The enclosing box is using the simple geometric shape to proximately simulate a complex shape of the feature element to increase calculation efficiency for defect inspection using the CNN. In particular, a solder joint image in an enclosing box is in fact used as input into the CNN for extracting the corresponding target feature vector.

Figure 9:
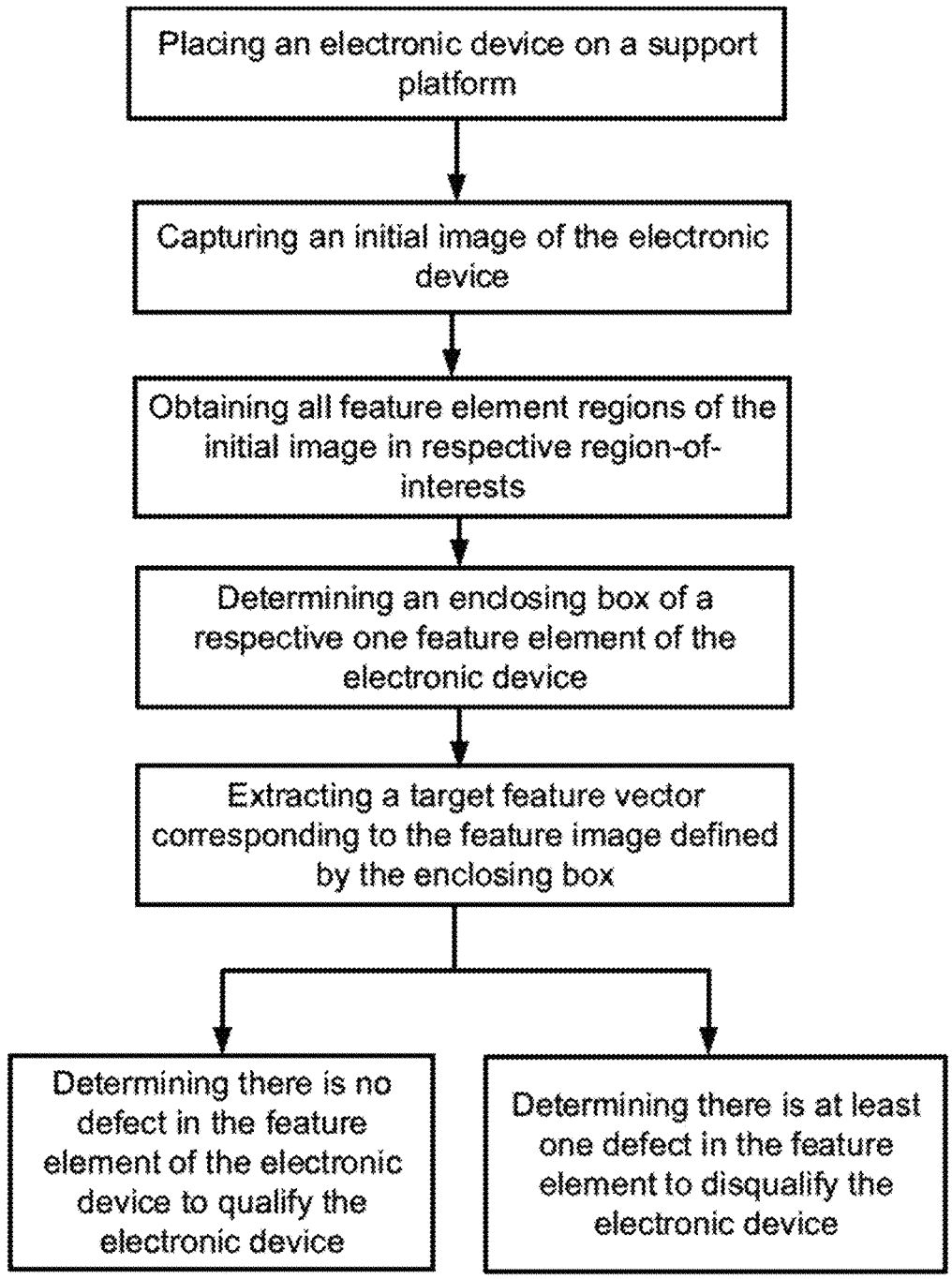
FIG. 9 is a flow chart of a method of using an inspection apparatus for defect inspection according to an embodiment of the present disclosure.

In yet another aspect, the present disclosure provides a method of using an inspection apparatus for defect inspection. FIG. 9 is a flow chart of a method of using an inspection apparatus for defect inspection of an electronic device according to an embodiment of the present disclosure. Optionally, the inspection apparatus can be one described in FIG. 6 and the electronic device can be a BGA chip or any similar device having potential multiple types of manufacture-related defects in one or more feature elements. Referring to FIG. 9, the method is a defect inspection method for a plurality of manufactured electronic devices. In particular, the method includes placing an electronic device on a support platform. The electronic device would be one of the manufactured devices loaded one by one on the support platform in the inspection apparatus. The inspection apparatus includes an imaging system. Optionally, the imaging system is a radiography imaging system, for example, shown in FIG. 6.

In the embodiment, the method includes capturing an initial image of the electronic device. The imaging system is operated to illuminate with an electromagnetic radiation onto the electronic device placed on the supporting platform and collecting image data converted by detecting the electromagnetic radiation passed through the electronic device.

Figure 10:
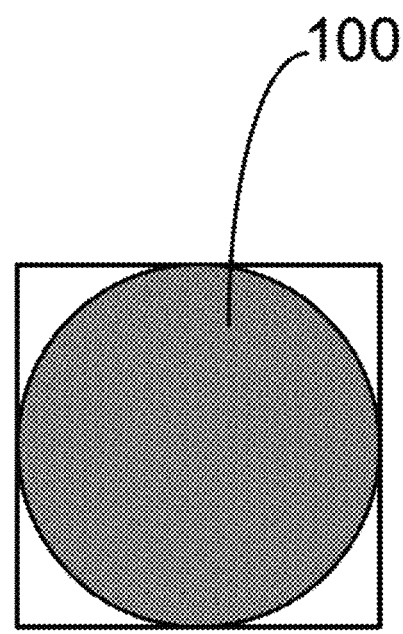
FIG. 10 is an exemplary diagram of a captured solder joint image according to an embodiment of the present disclosure.

Further in the embodiment, the method includes obtaining all feature element regions of the initial image in respective region-of-interests. Accordingly, a feature image that encloses one feature element therein is obtained associated with a respective one of all feature element regions. Furthermore, the method includes determining an enclosing box of the respective one feature element of the electronic device. As shown in FIG. 10, the enclosing box that encloses one feature element 100 in a center region of the image forms a feature image. One initial image of the electronic device may result in multiple feature images.

Moreover, the method includes extracting a target feature vector corresponding to the feature image defined by the enclosing box by inputting the respective one feature image into a convolutional neural network that is pre-trained using a training method disclosed in the present disclosure. Based on the target feature vector, an initial prediction probability of the respective one feature image corresponding to the respective one of different types of defect labels (which are predetermined for the specific feature element of electronic device and summarized as those likely occurred during manufacture process) can be determined from an output of the convolutional neural network (at least from an output of a last layer of classification layer of the CNN). Subsequently, the method includes determining there is no defect in the feature element of the electronic device to qualify the electronic device when none of the initial prediction probability of the respective one feature image corresponding to the respective one of different types of defect labels is greater than a predetermined threshold probability. Otherwise, the method includes determining there is at least one defect in the respective one feature element to disqualify the electronic device if at least one of the initial prediction probabilities of the respective one feature image corresponding to the respective one of different types of defect labels is greater than a predetermined threshold probability.

In still another aspect, the present disclosure provides an inspection apparatus. Optionally, the inspection apparatus includes an imaging system configured to capture an initial image of an electronic device having a feature element. Optionally, the inspection apparatus also includes a computer system comprising an interface device, a memory device, and a processor. The interface device of the computer system is configured to electronically couple with the imaging system. The memory device of the computer system is configured to store image data, control program, image process program, task programs, and network parameters based on which a convolution neural network is built and trained according to the method described herein. The processor of the computer system is configured to execute the control program to send control instruction via the interface device to the imaging system and receive image data converted from the initial image captured by the imaging system. The processor is also configured to execute the image process program to convert the initial image to a feature image using region-of-interest (ROI) location method and store the feature image having a feature element in a center region to the memory device. Additionally, the processor is configured to execute at least a first task program to extract a target feature vector corresponding to the feature image using the convolutional neural network. Furthermore, the processor is configured to execute at least a second task program to determine an initial prediction probability of the feature image corresponding to a respective one of all defect labels based on the target feature vector. Moreover, the processor is configured to execute at least a third task program to determine that no defect exists in the feature element of the electronic device only if none of the initial prediction probability of the feature image corresponding to the respective one of all defect labels is greater than a predetermined threshold value, or otherwise, to determine that a defect exists in the feature element of the electronic device.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of training a convolutional neural network through deep learning for defect inspection, the method comprising:
   collecting a training sample set including multiple solder joint images, a respective one of the multiple solder joint images comprising at least one of multiple solder joints having different types of solder joint defects, the at least one of multiple solder joints being located substantially in a pre-defined region of interest (ROI) in a center of the respective one of the multiple solder joint images;
   inputting the training sample set to a convolutional neural network to obtain target feature vectors respectively associated with the multiple solder joint images; and
   adjusting network parameters characterizing the convolutional neural network through a training loss function associated with a classification layer based on the target feature vectors and pre-labeled defect labels corresponding to different types of solder joint defects;
   wherein the method further comprises performing binarization of an image in a solder joint region by threshold segmentation.

2. The method of claim 1, wherein the convolutional neural network comprises one or more stages, a respective one stage comprising one or more convolutional layers and one max-pooling layer, a respective one convolutional layer being followed by a feature-enhancement network.

3. The method of claim 1, wherein adjusting network parameters comprises:
   converting a respective one of the defect labels to a first K-dimension feature vector corresponding to a respective one of different types of solder joint defects;
   transposing the first K-dimension feature vector to a transposed K-dimension feature vector;
   reducing dimensionality of a respective one of the target feature vectors corresponding to a respective one of the multiple solder joint images to a second K-dimension feature vector;
   determining a target prediction probability of the respective one of multiple solder joint images corresponding to the respective one of the defect labels; and
   adjusting network parameters through the training loss function based on the target prediction probability of the respective one of multiple solder joint images corresponding to the respective one of the defect labels, the transposed K-dimension feature vector of the respective one of defect labels, and the second K-dimension feature vector of the respective one of multiple solder joint images.

4. The method of claim 3, wherein the training loss function is a Sigmoid cross entropy loss function $$L_s = -\sum_{m=1}^{M} [y_m \log \hat{y}_m + (1-y_m)\log(1-\hat{y}_m)]$$

associated with the classification layer, wherein M represents a total number of different types of defect labels, m is an integer varying from 1 to M, $\hat{y}_m$ represents a target prediction probability of the respective one of the multiple solder joint images having a m-th type defect label, $y_m$ represents a preset true probability value of the respective one of multiple solder joint images having the m-th type defect label.

5. The method of claim 3, wherein the training loss function is a Rank loss function $L_r = \Sigma_{i \in M} \Sigma_{j \in M} [1-Q(i,j)] \max(0, m_0 - V_i^T Z + V_j^T Z)$ associated with the classification layer, wherein Q(i, j) represents a predetermined occurrence probability of a solder joint image having both an i-th type of defect label and a j-th type of defect label, i and j are integers varying from 1 to M and not equal, $m_0$ represents a predetermined parameter, $V_i^T$ represents one of the transposed K-dimension feature vector corresponding to the i-th type of defect label, $V_j^T$ represents one of the transposed K-dimension feature vector corresponding to the j-th type of defect label, Z represents one of the second K-dimension feature vector corresponding to a respective one of multiple solder joint images.

6. The method of claim 3, wherein the training loss function is a linear combination of a Sigmoid cross entropy loss function $L_s$ and a Rank loss function $L_r$ with a weight factor 1; wherein, $$L_s = -\sum_{m=1}^{M} [y_m \log \hat{y}_m + (1-y_m)\log(1-\hat{y}_m)],$$

M represents a total number of different types of defect labels, m is an integer varying from 1 to M, $\hat{y}_m$ represents a target prediction probability of the respective one of the multiple solder joint images having a m-th type defect label, $y_m$ represents a preset true probability value of the respective one of multiple solder joint images having the m-th type defect label;

$$L_r = \Sigma_{i \in M} \Sigma_{j \in M} [1 - Q(i,j)] \max(0, m_0 - V_i^T Z + V_j^T Z),$$

Q(i, j) represents a predetermined occurrence probability of a solder joint image having both an i-th type of defect label and a j-th type of defect label, i and j are integers varying from 1 to M and not equal, $m_0$ represents a predetermined parameter, $V_i^T$ represents one of the transposed K-dimension feature vector corresponding to the i-th type of defect label, $V_j^T$ represents one of the transposed K-dimension feature vector corresponding to the j-th type of defect label, Z represents one of the second K-dimension feature vector corresponding to a respective one of multiple solder joint images.

7. The method of claim 6, wherein adjusting network parameters comprises:
fixing parameters associated with one of the Sigmoid cross entropy loss function $L_s$ and the Rank loss function $L_r$;
adjusting network parameters through varying parameters associated with another one of the Sigmoid cross entropy loss function $L_s$ and the Rank loss function $L_r$;
obtaining the target feature vectors respectively associated with the multiple solder joint images from the convolutional neural network based on adjusted network parameters;
iterating a preset number of steps of fixing parameters and adjusting network parameters to obtain the target feature vectors;
fixing parameters associated with one of the Sigmoid cross entropy loss function $L_s$ and the Rank loss function $L_r$ which was used for adjusting network parameters at a latest iteration step; and
adjusting network parameters through varying parameters associated with the another one of the Sigmoid cross entropy loss function $L_s$ and the Rank loss function $L_r$ which was fixed at the latest iteration step.

8. The method of claim 3, wherein determining the target prediction probability of the respective one of multiple solder joint images corresponding to the respective one of the defect labels comprising:
determining an initial prediction probability of the respective one of multiple solder joint images corresponding to the respective one of the defect labels based on the respective one of the target feature vectors; and
determining the target prediction probability based on the initial prediction probability and a preset occurrence probability of a solder joint image in the training sample set having the respective one of the defect labels.

9. The method of claim 2, wherein inputting the training sample set to a convolutional neural network to obtain target feature vectors respectively associated with the multiple solder joint images comprises:
obtaining a respective one of initial feature vectors corresponding to the respective one of the multiple solder joint images outputted from a respective convolutional layer of the convolutional neural network based on the training sample set; and
inputting at least an initial feature vector outputted from a last convolutional layer one-by-one through the feature-enhancement network to a first fully connected layer and a second fully connected layer to obtain the target feature vectors respectively associated with the multiple solder joint images, wherein the first fully connected layer uses at least two different activation functions to perform a convolution operation and the second fully connected layer uses one activation function to perform a convolution operation.

10. The method of claim 9, wherein the first fully connected layer uses Sigmoid function and tan h function as activation functions, the second fully connected layer uses Sigmoid function or Relu function as activation function.

11. The method of claim 9, further comprises inputting a respective one of initial feature vectors outputted from a respective one of different convolutional layers one-by-one to the first fully connected layer and the second fully connected layer to obtain the target feature vectors associated with the multiple solder joint images.

12. A method of detecting solder joint defect comprising:
obtaining a solder joint image of an electronic device having a solder joint, the solder joint image including one solder joint located in a region of interest in a center thereof;
extracting a target feature vector associated with the solder joint using a convolutional neural network;
determining initial prediction probabilities of the solder joint image corresponding to all defect labels based on the target feature vector;
determining that the solder joint of the electronic device has no defect only if none of initial prediction probabilities of the solder joint image corresponding to all defect labels is greater than a threshold value; and
determining that the solder joint of the electronic device has a defect if one of initial prediction probabilities of the solder joint image corresponding to all defect labels is greater than the threshold value;
wherein obtaining a solder joint image of an electronic device having a solder joint comprises performing binarization of an initial image in a solder joint region by threshold segmentation.

13. The method of claim 12, wherein obtaining a solder joint image of an electronic device having a solder joint comprises:
capturing the initial image of the electronic device;
locating the solder joint region for a respective one of all solder joints in a region of interest of the initial image of the electronic device; and
determining an enclosing box of a respective one of all solder joints after performing the binarization of the initial image in the solder joint region by threshold segmentation, wherein the enclosing box forms h solder joint image.

14. The method of claim 13, further comprising using a Median filtering or Gaussian filtering to reduce noises in the initial image; using grayscale linear transformation and unsharp mask image to adjust a display contrast of the initial image.

15. An inspection apparatus comprising:
an imaging system configured to capture an initial image of an electronic device having a feature element; and
a computer system comprising an interface device, a memory device, and a processor, the interface device being configured to electronically couple with the imaging system, the memory device being configured to store image data, control program, image process program, task programs, and network parameters based on which a convolution neural network is built and trained, the processor being configured to execute the control program to send control instruction via the interface device to the imaging system and receive image data converted from the initial image captured by the imaging system, to execute the image process program to convert the initial image to a feature image using region-of-interest (ROI) location method and store the feature image having a feature element in a center position to the memory device, and to execute at least a first task program to extract a target feature vector corresponding to the feature image using the convolutional neural network, at least a second task program to determine an initial prediction probability of the feature image corresponding to a respective one of all defect labels based on the target feature vector, at least a third task program to determine that no defect exists in the feature element of the electronic device only if none of the initial prediction probability of the feature image corresponding to the respective one of all defect labels is greater than a predetermined threshold value, or otherwise, to determine that a defect exists in the feature element of the electronic device;

wherein the processor is further configured to perform binarization of the initial image in a solder joint region by threshold segmentation.

16. The inspection apparatus of claim 15, wherein the imaging system comprises a radiography imager including a radiation source, a sample desk, and a detector device, wherein the radiation source comprises one selected from X-ray source, g-ray source, e-beam source.

17. The inspection apparatus of claim 15, wherein the feature image comprises an image within an enclosing box that substantially enclosing one feature element of the electronic device in a center of the enclosing box.

18. The inspection apparatus of claim 15, wherein the electronic device comprises a BGA chip, the feature element comprises a solder joint.

\* \* \* \* \*